Patented Feb. 4, 1930

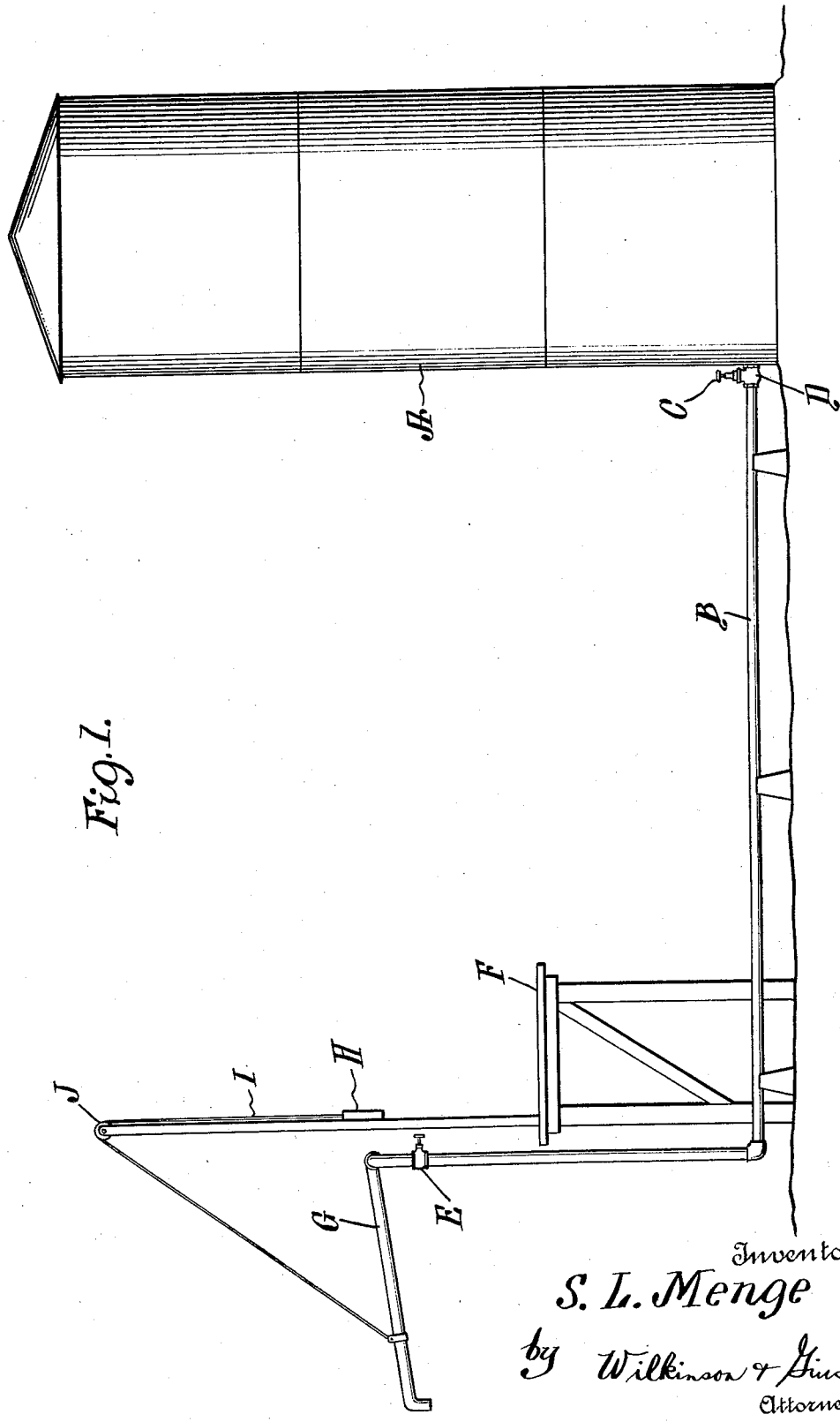

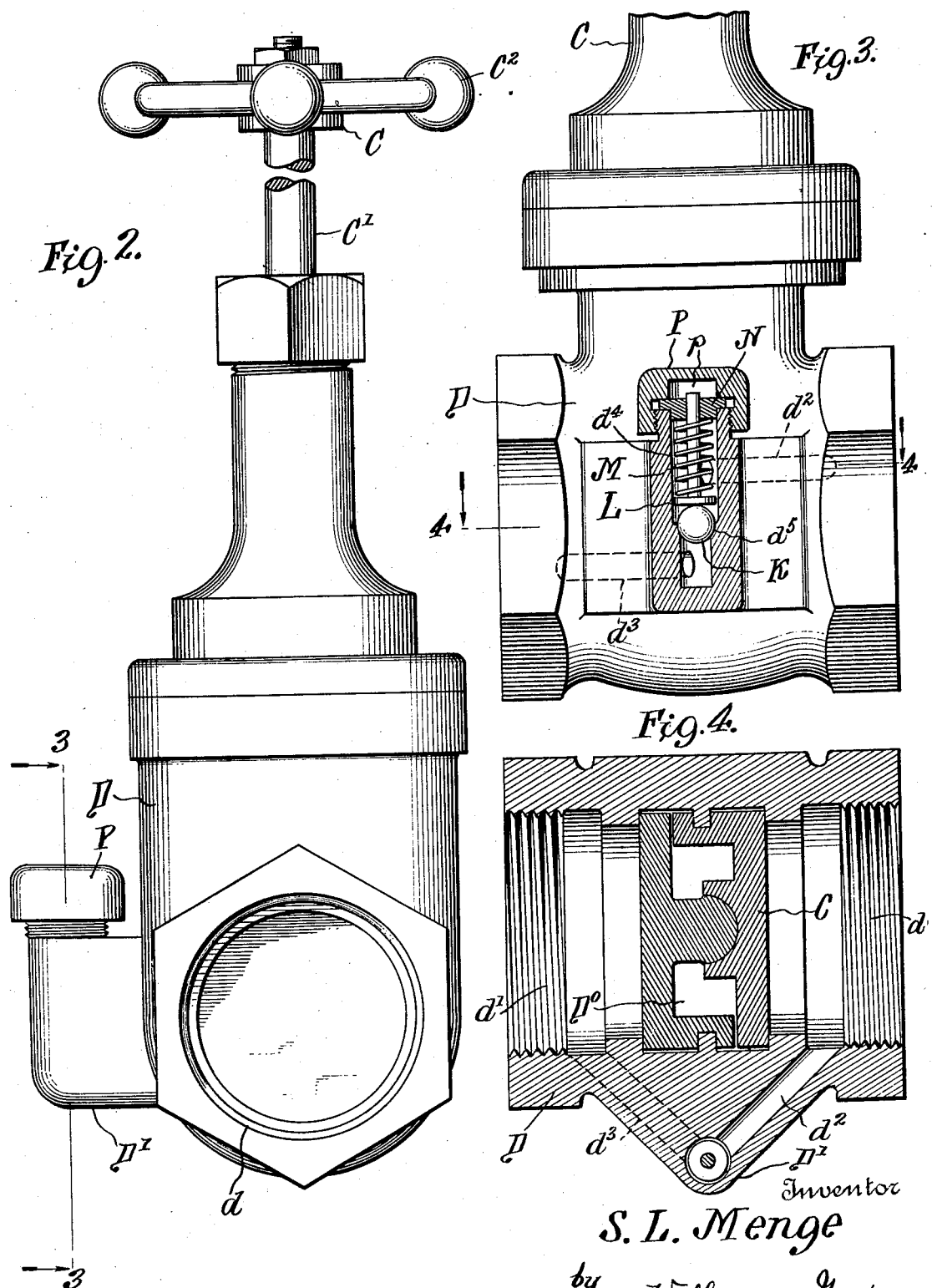

1,746,160

UNITED STATES PATENT OFFICE

SIDNEY LAWRENCE MENGE, OF NEW ORLEANS, LOUISIANA

EXPANSION PRESSURE-RELIEF-VALVE MECHANISM

Application filed January 31, 1927. Serial No. 164,922.

My present invention relates to improvements in valve arrangements wherein the main valve casing is provided with a by-pass with the check valve controlling said by-pass, so arranged that said check valve will remain closed against the outflow of liquid when the main valve is closed, and yet which will permit the return of liquid around the main valve back to the tank or reservoir from which the liquid is ordinarily drawn.

It is well-known that, where there is a long pipe connecting the source of supply of liquid and the point of delivery of the liquid, and this pipe becomes full of liquid when closed, when the temperature of the air rises, the liquid in the pipe will tend to expand with the possible result that the pipe may burst, unless some by-pass arrangement is provided. Such an arrangement is especially desirable in connection with pipe lines leading from oil or gasoline tanks; and my invention is especially adapted to be used in this connection.

My invention is further intended to provide an arrangement whereby, when the main valve is locked, it will be impracticable to so tamper with the check valve controlling the by-pass as to permit the flow of liquid from the source of supply through the delivery pipe. My invention will be more fully understood after reference to the accompanying drawings, in which like parts are indicated by similar reference symbols throughout the several views, and in which Figure 1 is a diagrammatic view, showing in elevation a storage tank containing the liquid and a delivery pipe connected thereto, with a main valve provided with a by-pass, when closed, with the delivery valve near the far end of the line.

Figure 2 shows a side elevation of the casing contained in the main valve, with the by-pass attachment, parts being broken away.

Figure 3 shows a vertical section through the check valve arrangement, along the line 3—3 of Figure 2, and looking in the direction of the arrows; and Figure 4 shows a horizontal section along the line 4—4 of Figures 2, and 3, and looking down.

Referring first to Figure 1, A represents the tank or reservoir in which liquid, such as oil or water, or the like, is contained, and B represents an outlet pipe from the same, which pipe is primarily controlled by the main valve C mounted in the casing D. This pipe B is shown as further controlled by the delivery valve E, adjacent the platform F on which the operator stands. G represents the swinging arm of the pipe, such as used in watering locomotives, and which is substantially balanced by the counter-weight H connected by the rope or chain I passing over the pulley J. It will be seen that when the valves C and E are opened, the liquid will continue to flow through the pipe B, but when these two valves are closed, there will be a body of liquid imprisoned in the pipe between said valves, which, if the atmospheric temperature becomes materially increased while these valves are closed, may cause the liquid to expand and break the pipe. To provide against this, the check valve arrangement shown in Figures 2, 3 and 4 is provided.

I have shown as the preferred type of main valve a gate valve C connected to the valve stem C' and operated by the hand wheel $C^2$; but instead of a gate valve, any suitable form of valve, such as a cone valve or the like could be used. This main valve is mounted in the valve chamber $D^0$, which chamber is connected on the one side with the passage $d$ to the tank or source of liquid supply, and on the other side as by the passage $d'$ to the outlet pipe B; so that when the valve is raised, the liquid will flow freely through the pipe line B, as shown. In order to provide for the expansion of the liquid in this pipe line when both valves C and E are closed, the valve casing D is provided with the extension D', having passages $d^2$ connected to the passage $d$ in the valve casing, and $d^3$ connected to the outlet passage $d'$ in the main valve casing. Between these two passages $d^2$ and $d^3$ is the by-pass chamber $d^4$ for the check valve K, which is shown as a ball seated on the conical valve seat $d^5$. This ball is normally pressed down in closed position by means of the plunger L, and spring M. The stem of this plunger travels through the guide N held beneath the screw cap P, which is recessed as at $p$ to permit the limited play of the plunger M in the valve chamber, and thus to permit the lifting of the check valve K when the pressure in the pipe line B, incident to the expansion of the liquid therein, becomes excessive. This will permit a small portion of the liquid in the pipe line, subjected to such conditions, to flow back through the passage $d^2$ into the reservoir.

Any suitable well-known locking device, (not shown), may be used in connection with the main valve, and it will be obvious that when this main valve is locked, the liquid cannot be bled out of the tank or other source of liquid supply.

It will thus be seen that with this construction, a suitable pressure relief valve arrangement is provided which will protect the pipe line against accidents due to changes in atmospheric temperatures, such for instance, as usually occurs between the late night and the early afternoon.

As before stated, while I have shown a gate valve, any suitable form of main valve may be provided; and while I have shown a spring pressed ball valve for the pressure relief valve, any other suitable form of check valve may be used. It will also be obvious that various changes in the construction, combination and arrangement of parts may be used without departing from the spirit of my invention, and I do not mean to limit the invention to such details, except as particularly pointed out in the claim.

Having thus described my invention, what I claim and desire to secure by Letters Patent of the United States is:—

In combination with a tank, a supply pipe leading from the tank to a suitable point of discharge, and a discharge nozzle on the outer end of the pipe, a controlled valve in the pipe near said nozzle, and a second controlled valve at the tank between the same and the pipe for controlling the outflow of liquid from the tank to the pipe, said second valve comprising a casing having a main valve seat therein and a lateral projection having passages therein leading from the main valve casing at opposite sides of the main valve and provided with a relief valve seat controlling intercommunication between said passages, a valve in the projection for engaging the relief valve seat, and spring means mounted in the projection engaging the valve to yieldingly hold the latter to the relief valve seat whereby to normally close the passages between the opposite sides of the main valve in the casing, said relief valve seat facing away from the pipe and toward the tank whereby expansion of liquid in the pipe may unseat said relief valve and prevent damage to the pipe.

SIDNEY LAWRENCE MENGE.